United States Patent Office 3,137,385
Patented June 16, 1964

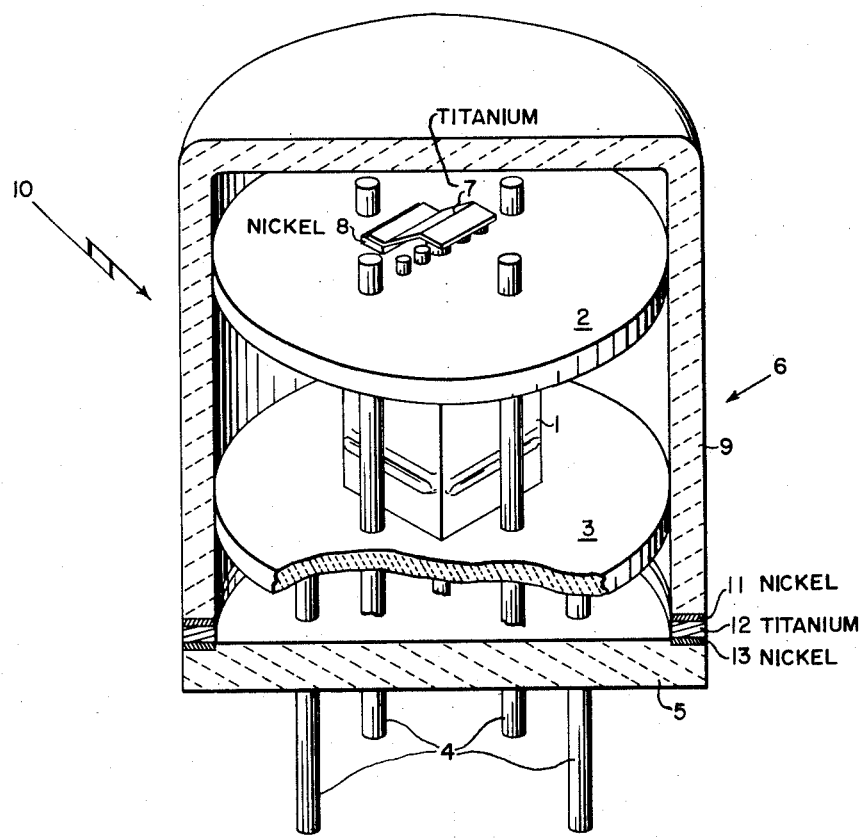

3,137,385
TITANIUM CERAMIC BOND USING AN INTERMEDIATE LAYER OF NICKEL
Pascal Levesque, Needham, Mass., assignor to Raytheon Company, Lexington, Mass., a corporation of Delaware
Filed Sept. 21, 1960, Ser. No. 57,554
9 Claims. (Cl. 206—.4)

This invention relates generally to means for preventing or eliminating the formation of metallic deposits on a ceramic surface, and more particularly to the utilization of such means in ceramic electron discharge devices.

In the manufacture of ceramic electron discharge devices, it is common procedure to getter the device at the time brazing is taking place, the gettering material conventionally being titanium. However, during this process it has been found that oftentimes electrical shorting occurs within the tube envelope which renders the tube useless for its intended purpose.

It is believed that at the temperatures used for brazing, titanium reacts with ceramic of the alumina type such as, for example, alumina, magnesia, and beryllia, to yield a metallic substance which deposits on cooler portions of the ceramic. This reaction occurs whenever the ceramic is in contact with the titanium under the above-mentioned conditions.

The reaction has been found to occur in a ceramic electron tube in which a titanium getter is attached to a ceramic spacer. As the tube envelope is evacuated, and heated to its sealing temperature, a metallic deposit forms on the interior portion of the tube envelope thereby short circuiting the tube pins.

In accordance with the present invention, this undesirable reaction between titanium and the ceramic is eliminated by separating the titanium from the ceramic by means of a metal that is incapable of reducing the ceramic to its metallic form.

In addition to preventing undesirable results during gettering of an electron discharge device, the present invention may be used wherever a metal-to-ceramic seal is needed.

The present invention will be better understood as the following description proceeds taken in conjunction with the accompanying drawing in which the single figure is a pictorial, partly broken-away view of a ceramic electron discharge device in accordance with the invention.

Referring now to the drawing, the single figure shows generally at 10 a vacuum tube comprising plate electrode 1, insulating spacers 2 and 3, and pins 4 passing through ceramic base portion 5. The electrodes are enclosed in ceramic envelope 6, comprised of casing 9 and base portion 5. The ceramic material used for spacers 2 and 3, and for envelope 6 may be of the alumina type, as for example, alumina, magnesia, beryllia, or the like. In order to properly degas the tube during manufacture and subsequent operation, a titanium getter 7 is provided which is attached to shim 8 composed of a material which is incapable of reducing the ceramic to its metallic form at elevated temperatures, as for example, nickel. Nickel shim 8 is disposed between elements 7 and 2 and prevents contact between the titanium strip 7 and the ceramic spacer 2 thereby preventing any reaction between the titanium and the ceramic. Accordingly, no metallic deposit can form on the base 5 or other interior portions of envelope 6, and it follows that pins 4 will not be short-circuited.

In actual practice, the use of the nickel shim 8 prevented deposits in envelope 6 when the tube was subjected to a temperature range of about 600 to 700° C. during brazing.

In accordance with a further feature of the present invention, a nickel separator is also utilized as a means of preventing undesirable reaction between titanium and the ceramic portions of the envelope when titanium is utilized as a sealing material, whereby the ceramic casing 9 is sealed to the ceramic base 5.

In this connection, the figure shows a nickel shim 13 placed between a titanium shim 12 and ceramic base 5, and a nickel shim 11 placed between titanium shim 12 and ceramic casing 9. The nickel shims 13 and 11, being disposed between the titanium and the ceramic, prevent any metallic deposit from forming in the interior portions of envelope 6 by eliminating any contact between the titanium and the ceramic as the seal is being formed. As an alternative means to the nickel shim, use may be made of a nickel plated titanium shim instead of separate nickel and titanium shims, since the result would be the same in either case, i.e., the titanium-ceramic reaction is eliminated by eliminating the direct contact between the titanium and the ceramic.

The present invention, therefore, provides a simple, economical means of eliminating the formation of a metallic deposit on a ceramic surface, and more specifically of preventing the formation of short circuiting paths within a ceramic tube by eliminating the formation of metallic deposits on the ceramic envelope.

Although there has been described what is considered to be a preferred embodiment of the present invention, various adaptations and modifications thereof may be made without departing from the spirit and scope of the invention as defined in the appended claims.

What is claimed is:

1. An insulator-metal bond structure comprising a member of alumina-type ceramic insulating material, a member of titanium, and a spacer member composed of a material which does not react with said insulating material at high temperature interconnecting said insulating material and said titanium member.

2. An insulator-metal bond structure comprising a member of alumina-type ceramic insulating material, a member of a metal which reacts with such insulating material at high temperature, and a spacer member of nickel interconnecting said insulating material and said metal member.

3. An insulator-metal bond structure comprising a member of alumina-type ceramic insulating material, a member of titanium, and a spacer member of nickel interconnecting said insulating material and said metal member.

4. In an electron discharge device, an insulator-metal bond structure comprising a member of alumina-type ceramic insulating material, a getter member of titanium, and a spacer member composed of a material which does not react with said insulating material at high temperature interconnecting said insulating material and said getter member.

5. In an electron discharge device, an insulator-metal bond structure comprising a member of alumina-type ceramic insulating material, a getter member of a metal which reacts with said insulating material at high temperature, and a spacer member of nickel interconnecting said insulating material and said getter member.

6. In an electron discharge device, an insulator-metal bond structure comprising a member of alumina-type ceramic insulating material, a getter member of titanium, and a spacer member of nickel interconnecting said insulating member and said getter member.

7. An insulator-metal bond structure comprising first and second insulating members of alumina-type ceramic material, a sealing member of titanium disposed between said first and second insulating members, and spacer members composed of a material which does not react with said ceramic material at high temperature interconnecting said sealing member with each of said insulating members.

8. An insulator-metal bond structure comprising first and second insulating members of alumina-type ceramic material, a sealing member of a metal which reacts with said ceramic material at high temperature disposed between said first and second insulating members, and spacer members of nickel interconnecting said sealing member with each of said insulating members.

9. An insulator-metal bond structure comprising first and second insulating members of alumina-type ceramic material, a sealing member of titanium disposed between said first and second insulating members, and spacer members of nickel interconnecting said sealing member with each of said insulating members.

References Cited in the file of this patent

UNITED STATES PATENTS

| | | |
|---|---|---|
| 2,749,462 | Kenty | June 5, 1956 |
| 2,900,549 | Doolittle | Aug. 18, 1959 |